Jan. 5, 1954 F. L. WENINGER 2,664,782
CONTROL FOR PHOTOGRAPHIC COPYING APPARATUS
Filed Sept. 9, 1950 2 Sheets-Sheet 1
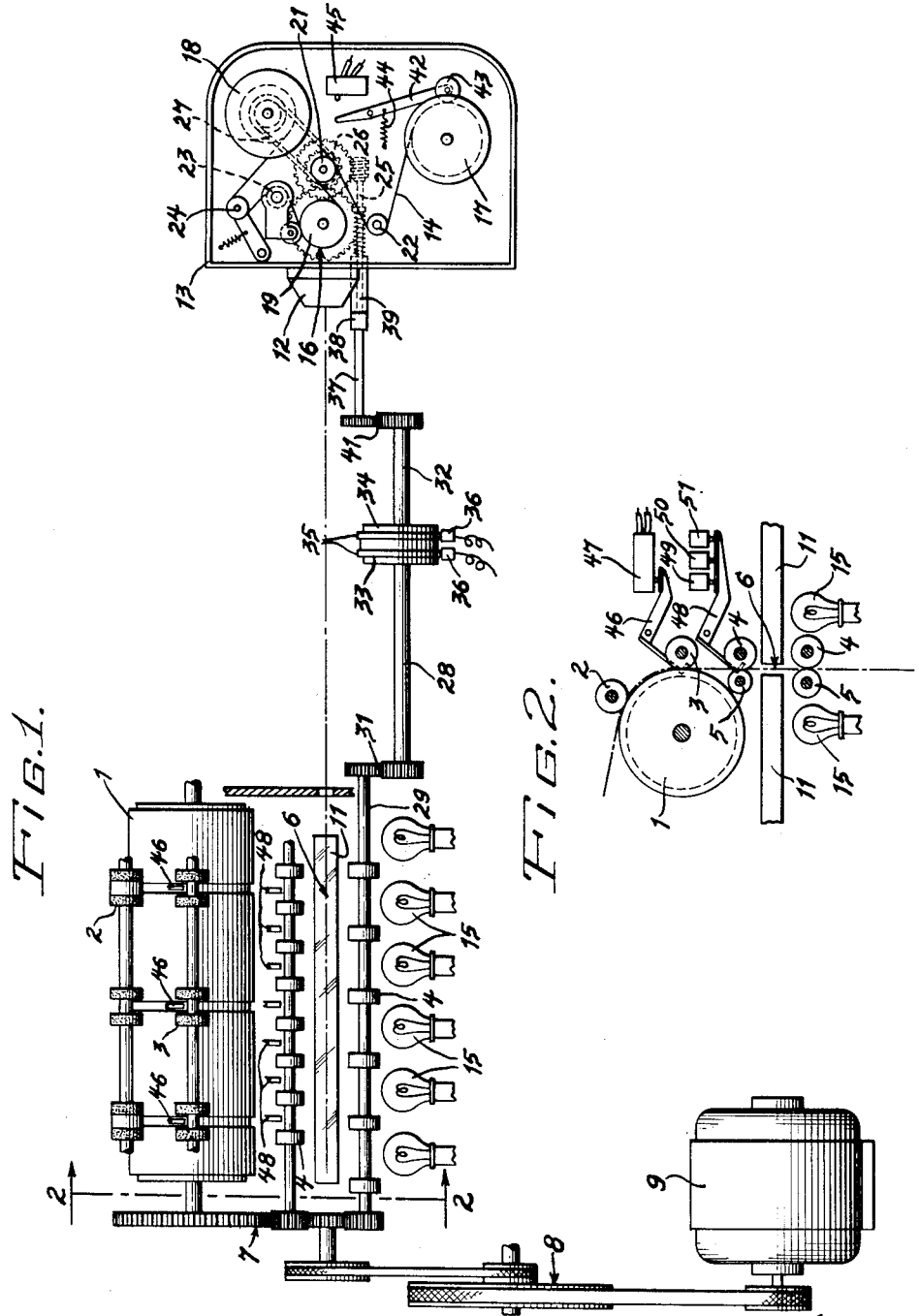
Inventor:
Frank L. Weninger
By Robert F. Miehle, Atty.

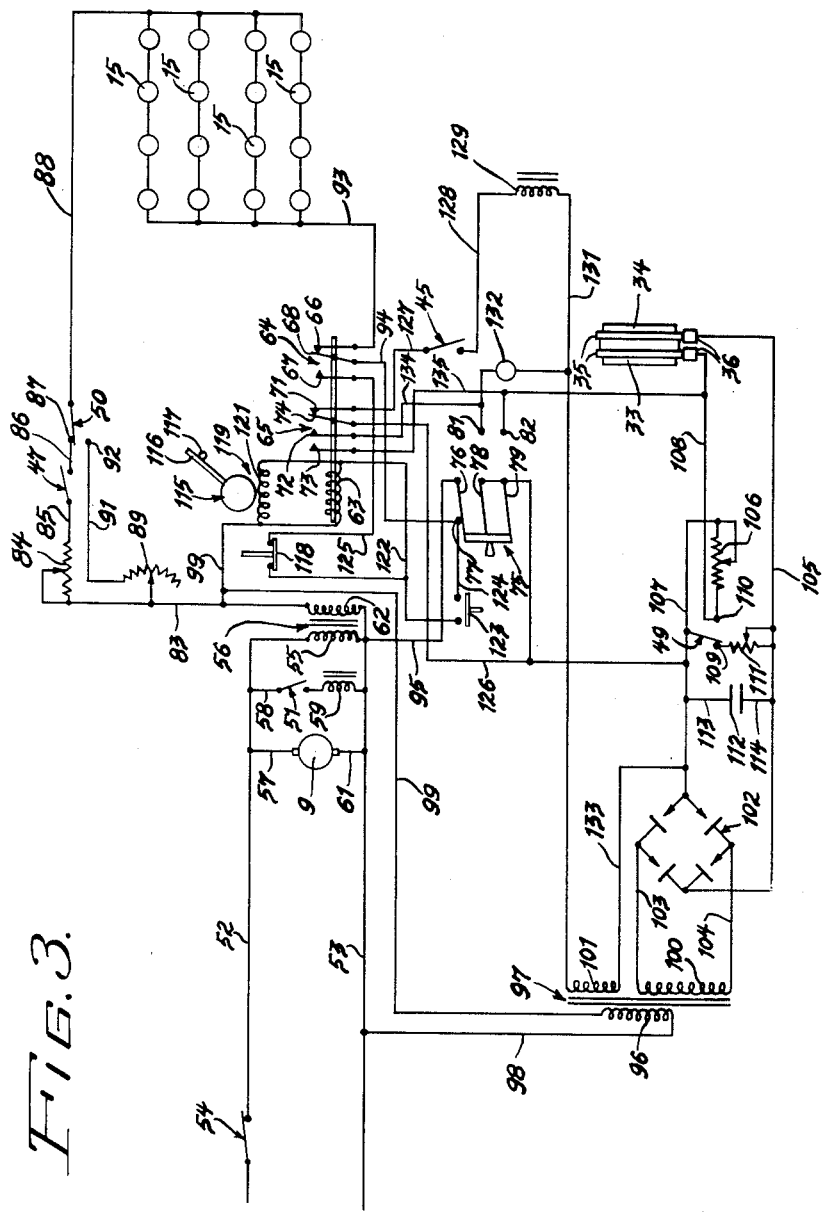

UNITED STATES PATENT OFFICE 2,664,782

CONTROL FOR PHOTOGRAPHIC COPYING APPARATUS

Frank L. Weninger, Chicago, Ill., assignor to Bell & Howell Company, Chicago, Ill., a corporation of Illinois Application September 9, 1950, Serial No. 184,079

9 Claims. (Cl. 88—24)

The present invention relates particularly to the control of micro-recording apparatus in which sheets or documents are fed in succession and in a continuous manner through the photographic field of a camera and a sensitized strip in the camera is fed under the control of the fed sheets in a continuous manner through the exposure field of the camera in synchronism with the fed sheets during the photographing operation, and more particularly concerns a control of the type described and claimed in United States application for Letters Patent of Sverre J. Engstrom, Serial No. 102,854, filed July 2 1949, for improvement in Control for Photographic Copying Apparatus, on which this invention may be considered an improvement.

Objects of the invention reside in the provision of a novel, effective and reliable control for photographic copying apparatus which promotes the efficiency and convenience of operation of the apparatus, which provides an efficient and reliable control, by sheets as they are fed through the apparatus, of the feeding of a sensitized strip on which the sheets are photographed and of the illumination of the sheets as they are photographed with a view toward effecting uniform spacing of the photographs on the sensitized strip irrespective of the frequency at which sheets are fed into the apparatus and toward assuring proper and uniform illumination of the sheets as they are photographed, which provides for conveniently and with minimum attention on the part of the operator, operating the sensitized strip feeding means of the camera of the apparatus to wind the usual leader and trailer portions of the sensitized strip in the camera onto the take up reel of the strip feeding means preparatory to exposure of the strip and to removal of the strip from the camera after exposure of the strip, which provides for conveniently feeding the sensitized strip in the camera to provide space on the strip between portions thereof on which sheets or documents are photographed, which provides for de-energizing the illuminating means of the apparatus during such operations in which illumination is not necessary, and which provides indicating means for indicating various conditions of operation of the apparatus.

The invention will be better understood by reference to the accompanying drawing forming a part hereof and in which—

Figure 1 is a schematic view in side elevation showing various elements of a photographic copying apparatus in the form of a micro-recorder;

Figure 2 is a sectional view taken substantially on the line 2—2 of Figure 1; and Figure 3 is a wiring diagram of the control of my invention.

Referring to Figures 1 and 2 of the drawing, a horizontal rotatable feed drum 1 receives sequentially fed sheets or documents, and rotatable pressure rollers 2 and 3 are yieldably urged into pressure engagement with the feed drum, and the sheets or documents, as they are fed to the feed drum, are engaged between the feed drum and pressure rollers and are fed downwardly by the feed drum as it is rotated.

A pair of vertically spaced horizontal rotatable feed rollers 4 are arranged below the feed drum 1 in parallelism therewith and rotatable pressure rollers 5 are yieldably urged into pressure engagement respectively with the feed rollers 4. Sheets fed edgewise downwardly from the feed drum 1 engage between the rollers 4 and 5 and are vertically and downwardly fed edgewise through a photographic field 6 between the pairs of rollers 4 and 5, this photographic field being that of the camera apparatus, hereinafter described. The sheet path is indicated by the dot and dash line in Figure 2. The feed drum 1 and the feed rollers 4 are driven in timed relation by gearing, generally designated at 7 in Figure 1, which is driven through a belt and pulley transmission 8 from an electric motor 9.

A pair of opposed converging reflectors 11 are arranged in a horizontal plane and transversely of the vertical sheet path and obliquely to and on opposite sides of the photographic field 6 for reflecting images of opposite faces of the fed sheets as they pass the photographic field 6 to the objective 12 of a photographic camera 13 for the photographing of opposite faces of the fed sheets on a sensitized film or strip 14 in the camera. Two horizontal banks of incandescent electric lamps 15 are arranged respectively on opposite sides of the vertical sheet path in parallelism therewith and immediately below the photographic field 6 and reflectors 11 for illuminating opposite faces of the fed sheets at the photographic field for the photographing of said opposite faces.

The camera 13 is of the flow type and is provided therein with strip feeding means for feeding the sensitized strip 14 in the camera through the exposure field 16 of the camera at the rear of the objective 12, and, see Figure 1, the strip feeding means comprises as follows:

Vertically spaced feed and take up reels 17 and 18 are rotatably mounted in the camera in the usual manner providing for installation of the reels in and removal thereof from the camera. A rotatably mounted exposure drum 19 of relatively large diameter is disposed to the rear of the objective 12 and supports the sensitized strip 14 at the exposure field 16 of the camera. A rotatably mounted idler roller 21 is disposed to the rear of the exposure drum 19, a rotatably mounted idler roller 22 is disposed below the exposure drum, and two vertically spaced rotatably mounted idler rollers 23 and 24 are disposed above the exposure drum.

The sensitized strip 14 extends from a roll of the strip on the lower or feed reel 17 about the roller 22, then in an opposite manner about the roller 21, then in an opposite manner about the exposure drum 19, then in an opposite manner about the roller 23, then in an opposite manner about the roller 24, and finally to a roll of the sensitized strip on the upper or take up reel 18 on which the strip is wound as it is exposed.

A shaft 25 is rotatably mounted on the camera 13 in parallelism with the focal axis of the camera and the exposure drum 19 is driven from this shaft through gearing generally designated at 26, and the take up reel 18 is driven from the gearing 26 by a yielding belt and pulley drive 27 to take up the sensitized strip as it is fed by rotation of the exposure drum 19.

A rotatable shaft 28 is disposed in parallelism with the shaft 29 of the lower sheet feed roller 4, and is driven therefrom by gearing 31, so that the shaft 28 is driven from the motor 9. A rotatably mounted shaft 32 is alined with the shaft 28 and is selectively driven therefrom by an electromagnetic clutch comprising a solenoid element 33 secured on the shaft 28 and a clutch element 34 of magnetic material secured on the shaft 32 and attracted into frictional engagement with the clutch element 33 when the latter is energized to a sufficient exent, the clutch element 33 being energized through slip rings 35 thereon and brushes 36 respectively contacting the slip rings.

A rotatable shaft 37 is alined with the camera drive shaft 25, and is connected with the camera shaft to drive the same by a normally engaged clutch comprising toothed clutch elements 38 and 39 respectively secured on these shafts. The shaft 37 is driven from the shaft 32 by gearing 41, so that assuming the electromagnetic clutch 33—34 to be engaged, the sensitized strip feeding mechanism is driven from the motor 9 in timed relation with the sheet feeding mechanism which is also driven from the motor, the sheet feeding mechanism comprising the feed drum 1 and the rollers 4 driven from the motor and the pressure rollers 2, 3 and 5. When the sheets, fed by the sheet feeding mechanism, are being photographed on the sensitized strip 14, the electromagnetic clutch is engaged so that the sensitized strip in the camera is fed in timed relation with the sheets as they pass through the photographic field 6 and in the direction opposite that in which the sheets are fed, and when sheets are not being fed, the electromagnetic clutch is normally disengaged so that the sheet feeding mechanism may be driven by the motor in readiness to feed sheets without necessitating feeding of the sensitized strip in the camera, the electromagnetic clutch being automatically controlled in this respect as hereinafter described.

A lever 42 is pivotally mounted within the camera and one end of this lever is provided with a roller 43 which is engaged against the roller of the sensitized strip 14 on the feed reel 17 by a spring 44, and when this roll approaches minimum diameter, the spring causes the lever to close a normally open film supply switch 45 in the camera to energize a signal circuit, as hereinafter described, for indicating to the operator that the unexposed portion of the sensitized strip in the camera is nearing exhaustion.

A pivotally mounted switch arm 46 is yieldably urged into a normal position in which one end thereof in the form of spaced fingers projects across the path of the fed sheets as they are fed toward the photographic field 6, and a fed sheet engages this arm and moves and maintains it out of the sheet path while the switch arm is under the control of the sheet. A light control switch 47, under the control of the switch arm 46, is yieldably urged into open position and remains open when the switch arm is in its normal position and is closed by the switch arm when it is positioned under the control of a fed sheet.

A pivotally mounted switch arm 48 is yieldably urged into a normal position in which one end thereof in the form of spaced fingers projects across the path of the fed sheets as they are fed toward the photographic field 6, and a fed sheet engages this arm and moves and maintains it out of the sheet path while this switch arm is under the control of the sheet. Clutch, light and counter control switches 49, 50 and 51 are under the control of the switch arm 48, and the counter control switch is yieldably urged into open position and remains open when the switch arm 48 is in its normal position and is closed by this switch arm when this switch arm is positioned under the control of a fed sheet. The clutch and light control switches 49 and 50 are double throw switches and each of these switches is yieldably urged into position closing one side thereof and remains in this position when the switch arm 48 is in its normal position and is positioned in its other position closing the other side thereof by this switch arm when this switch arm is positioned under the control of a fed sheet.

The switch arm 48 is disposed closer to the photographic field 6 than the switch arm 46 and the switch arms are spaced a distance lineally of the sheet path less than the corresponding dimension of the fed sheets, so that the switches 49, 50 and 51 are under the control of a fed sheet in following overlapping relation with the control of the switch 47 by the sheet for a purpose hereinafter appearing.

Referring to Figure 3, lead wires 52 and 53 are supplied from a suitable source of alternating current, the lead wire 52 being connected to one pole of said source through a main control switch 54. The lead wire 52 is connected to one terminal of the primary 55 of a constant voltage transformer 56, and is also connected to one terminal of the drive motor 9 and to one terminal of the counter control switch 51 respectively by wires 57 and 58. The other terminal of the switch 51 is connected with one terminal of a sheet counter actuating solenoid 59, and the lead wire 53 is connected with the other terminal of the driving motor 9 by a wire 61, and with the other terminals of the sheet counter solenoid and of the primary of the constant voltage transformer and with one terminal of the secondary 62 of the constant voltage transformer.

An electromagnetic relay comprises a relay coil 63 and two double throw switches 64 and 65 under the control of the relay coil and of which the switch 64 comprises two contacts 66 and 67 and a switch arm 68 therebetween and alternately contactable therewith and of which the switch 65 comprises three contacts 71, 72 and 73 and a switch arm 74 between the contacts 71 and 72 and alternately contactable therewith, the contact 72 being yieldably urged out of contact with the contact 73 and being contactable with the contact 73 by the switch arm 74 contacting the contact 72 and moving it into contact with the contact 73.

The switch arms 68 and 74 are yieldably urged into contact respectively with the contacts 66 and 71, so that when the relay coil 63 is deenergized the switch arms respectively contact these contacts and the contact 72 is out of contact with the contact 73, as shown in Figure 3. However, these switch arms are under the control of the relay coil and when it is energized the switch arms are actuated to their other positions in which the switch arm 68 is in contact with the contact 67 and the switch arm 74 is in contact with the contact 72 and the contact 72 is in contact with the contact 73.

A manually actuable triple pole control switch 75 of double throw character has one switch arm 76 thereof contactable with a contact 77 when the switch is in one position thereof as shown in Figure 3, and has the other two switch arms 78 and 79 thereof contactable respectively with contacts 81 and 82 when the switch is in the other position thereof.

The positions of the relay switches 64 and 65 and that of the control switch 75 shown in Figure 3 are those in which the micro recorder functions to photograph sheets or documents and comprise the switch arms 68 and 74 of the relay switches being respectively in contact with the contacts 66 and 71 by reason of the relay coil 63 being deenergized, and the switch arm 76 of the control switch being in contact with the contact 77.

A wire 83 connects the terminal of the secondary 62 of the constant voltage transformer 56 opposite that to which the line wire 53 is connected, with one terminal of a variable resistance 84, and a wire 85 connects the other terminal of this resistance with one terminal of the sheet controlled switch 47. A wire 86 connects the other terminal of this switch with one side contact 87 of the sheet controlled switch 50, and the switch arm of this switch is connected by a branch wire 88 with one terminal of series connected groups the illuminating lamps 15. One terminal of a variable resistance 89 is connected with the wire 83, and the other terminal of this variable resistance is connected by a wire 91 with the other side contact 92 of the sheet controlled switch 50. A branch wire 93 connects the other terminal of the series connected groups of the illuminating lamps 15 with the contact 66 of the relay switch 64, and a wire 94 connects the switch arm 68 of this relay switch with the contact 77 of the switch 75. A wire 95 connects the switch arm 76 with the lead wire 53 which is connected with the terminal of the constant voltage transformer secondary 62 opposite that with which the wire 83 is connected, thus completing the illuminating lamp circuit which is energized by the constant voltage transformer secondary.

It will be observed that the variable resistance 84, the sheet controlled switch 47 and the side contact 87 of the sheet controlled switch 50 are in series and are included in the illuminating lamp circuit and constitute one control circuit for the illuminating lamps 15, and that the variable resistance 89 and the side contact 92 of the sheet controlled switch 50 are in series and are included in the illuminating lamp circuit in shunt relation with the resistance 84, the switch 47 and the side contact 87 of the sheet controlled switch 50 and constitute another control circuit for the illuminating lamps.

The sheet controlled light control switch 47 is yieldably urged into open position and the sheet controlled double throw light control switch 50 is yieldably urged into position closing the side contact 87 thereof, so that when these switches are not under the control of a sheet fed by the sheet feeding means, the switch 47 is open and the circuit comprising resistance 84, the switch 47 and the side contact 87 of the switch 50 is open though this side contact of the switch 50 is closed, as shown in Figure 3, and the side contact 92 of the switch 50 is open and the circuit comprising the resistance 89 and this side contact of the switch 50 is also open.

When the switch 47 is under the control of a fed sheet by reason of the sheet engaging the switch arm 46, the switch 47 is closed, and assuming the switch 50 not to be under the control of a fed sheet and the side contacts 87 and 92 thereof consequently to be respectively closed and open, the circuit 84—47—87 is closed and the illuminating lamps are energized therethrough, and when the switch 50 is under the control of the fed sheet by reason of the sheet engaging the switch arm 48, the side contacts 87 and 92 of the switch 50 are respectively open and closed, the circuits 84—47—87 and 89—92 are respectively open and closed, and the illuminating lamps are energized through the circuit 89—92.

The secondary 62 of the constant voltage transformer delivers a voltage in excess of that required to sufficiently energize the illuminating lamps 15, and the resistance of the resistance 84 is less than that of the resistance 89, these resistances being variable primarily for adjusting them to accommodate varying conditions, so that the circuit 84—47—87 comprises an overvoltage circuit and the circuit 89—92 comprises a lower or normal voltage circuit. Consequently, when the switch 47 and the side contact 87 of the switch 50 are closed, excess voltage is impressed upon the illuminating lamps, and when the side contact 92 of the switch 50 is closed, the side contact 87 of this switch being consequently open, a lower or normal voltage is impressed on the illuminating lamps.

Recalling that the switch arm 48 is engaged by a sheet fed by the sheet feeding mechanism in following overlapping relation with engagement of the switch arm 46 by the sheet, the illuminating lamps are first energized through the overvoltage circuit 84—47—87 to quickly bring them up to the proper brilliancy and are then energized through the normal voltage circuit 89—92, in substantially continuing relation with energization thereof through the circuit 84—47—87, to maintain the illuminating lamps at the proper brilliancy during the passage of the sheet through the photographic field 6 for the photographing of the sheet.

The counter control switch 51, being yieldably urged into open position, is closed by the switch arm 48 while the switch arm is under the control of a fed sheet and intermittently energizes the counter control solenoid for actuating a counter for recording the number of sheets photographed.

The primary 96 of a transformer 97 has one terminal thereof connected with the lead wire 53 by a wire 98 and has the other terminal thereof connected with the wire 83 by a branch wire 99 so that the primary 96 is energized from the constant voltage transformer secondary 62, and the transformer 97 is provided with relatively high and low voltage secondaries 100 and 101. The terminals of the high voltage secondary 100 are connected respectively to the input terminals of a full wave rectifier 102 by wires 103 and 104. One output terminal of the rectifier is connected with one of the brushes 36 of the solenoid clutch element 33 by a wire 105, and the other output terminal of the rectifier is connected with one terminal of a variable resistance 106 by a wire 107. The other terminal of the resistance 106 is connected with the other brush 36 of the solenoid clutch element 33 by a wire 108, so that the resistance is connected in series with the solenoid clutch element and the solenoid clutch element is maintained in partially energized clutch disengaged condition by this resistance.

The clutch control switch 49 is a double throw switch and is yieldably urged into position closing one side contact 109 thereof, as shown in Figure 3, and remains in this position when the switch arm 48 is in its normal position and is positioned in its other position closing the other side contact 110 thereof when this switch arm is positioned under the control of a fed sheet. The switch arm of the switch 49 is connected with the wire 107, and a variable resistance 111 has one terminal thereof connected with the wire 105 and has the other terminal thereof connected with the side contact 109 of the switch 49. The other side contact 110 of the switch 49 is connected with the wire 108 and is thus connected in series with the solenoid clutch element 33 and in shunt with the resistance 106 for fully energizing this clutch element and engaging the clutch 33—34 when the side contact 110 is closed. A condenser 112 is connected across the wires 105 and 107 of the clutch supply circuit by wires 113 and 114.

When the switch 49 is in its normal position and not under the control of a sheet fed by the sheet feeding mechanism through the switch arm 48 and the side contacts 109 and 110 of this switch are respectively closed and open, the solenoid clutch element 33 is partially energized through the resistance 106 in series therewith but not to an extent sufficient to engage the clutch 33—34, and the resistance 111 is connected in shunt with the solenoid clutch element. When the switch 49 is under the control of a sheet fed by the sheet feeding mechanism through the switch arm 48, the side contacts 109 and 110 of this switch are respectively open and closed so that the resistance 111 is not connected in shunt with the solenoid clutch element 33 and the closed side contact 110 of the switch energizes the solenoid clutch element with the full potential of the clutch supply circuit and effects engagement of the clutch 33—34.

A sheet fed by the sheet feeding mechanism engages the switch arm 48 immediately before the sheet enters the photographic field 6 so that the illuminating lamps 15 are illuminated through the normal voltage circuit 89—92 and the clutch 33—34 is engaged to drive the sensitized strip in the camera for the photographing of the sheet as it passes through the photographic field.

The partial energization of the solenoid clutch element 33 by the resistance 106 increases the responsiveness of the clutch 33—34 with respect to engagement thereof and decreases the responsiveness of the clutch with respect to disengagement thereof, both of which are desirable. The resistance 111 and the side contact 109 of the switch 49 connected in series therewith, constitute a voltage regulating by-pass connected in shunt relation with the solenoid clutch element 33 for bleeding the clutch supply circuit when the solenoid clutch element is not fully energized and preventing the voltage of the clutch supply circuit from building up and thus providing uniform action of the clutch and consequent equal spacing the photographs on the sensitized strip 14 irrespective of differences in the interval of the feed of sheets to the sheet feeding mechanism such as is consequent to hand and automatic feeding of sheets to the sheet feeding mechanism. The condenser 112 as connected across the wires 105 and 107 constitutes a surge absorbing by-pass connected in shunt relation with the solenoid clutch element 33 and serves principally to absorb surge incident to disengagement of the clutch 33—34 and also serves to absorb direct current ripple in the clutch control circuit.

Assuming the relay switches 64 and 65 and the control switch 75 to be in the positions shown in Figure 3, as hereinbefore described, in which the micro-recorder functions to photograph sheets, and assuming a suitable alternating current to be impressed on the line wires 52 and 53 by closure of the main control switch 54, the drive motor 9 is energized and drives the sheet feeding mechanism. Each sheet as it is fed by the sheet feeding means toward the photographic field 6 engages the switch arm 46 and actuates it to close the light control switch 47 and thus energize the illuminating lamps 15 through the over-voltage circuit 84—47—87, the fed sheet closing the light circuit a short time before the sheet reaches the photographic field so that the lamps reach maximum brilliance before the sheet enters the photographic field.

As the fed sheet approaches closer to the photographic field after it has closed the switch 47 and immediately before it enters the photographic field, the fed sheet engages the switch arm 48 and actuates it to respectively open and close the side contacts 87 and 92 of the light control switch 50 and thus open the over-voltage and close the normal voltage illuminating lamp circuits, to respectively open and close the side contacts 109 and 110 of the clutch control switch 49, and to close the sheet counter solenoid control switch 51, so that the illuminating lamps are energized at normal voltage and the clutch 33—34 is engaged to feed the sensitized strip 14 in the camera during passage of the fed sheet through the photographic field for the photographing thereof, and the counter solenoid is energized, the switches 47, 49, 50 and 51 returning to their normal positions after the fed sheet passes out of controlling relation with the switch arms 46 and 48 preparatory to another photographing operation.

An interval timer of usual construction is schematically shown at 115 in Figure 3, and comprises a pivotally mounted switch arm 116 yieldably urged to one end of its movement against a stop 117, a timer switch 118 yieldably urged into closed position and adapted to be opened by the switch arm 116 when this switch arm is moved to the other end of its movement, and an electric timer motor 119 including a motor coil 121 for operating the switch arm at a governed velocity, to said other end of its movement to open the timer switch when the timer motor coil is energized, the governed velocity of the switch arm as operated by the motor providing the timing interval of the timer and the switch arm 116 returning to the first mentioned end of its movement under its yieldable urge when the timer motor is deenergized preparatory to another timing cycle of the timer.

The branch wire 99 which is connected to the wire 83, connects one terminal of the relay coil 63 and one terminal of the timer motor coil 121 with the wire 83, and a branch wire 122 connects the other terminals of the relay and timer motor coils with one terminal of a manually controlled cycle switch 123 which is yieldably urged into and normally maintained in open position, and with one terminal of the timer switch 118. The other terminal of the switch 123 is connected by a wire 124 with the contact 77 of the switch 75, and the other terminal of the timer switch 118 is connected by a wire 125 with the contact 67 of the relay switch 64.

A branch wire 126 connects the wire 107 with the switch arms 78 and 79 of the manually controlled switch 75 and with the switch arm 74 of the relay switch 65, and a wire 127 connects the contact 71 of the relay switch 65 with one terminal of the film supply switch 45. A wire 128 connects the other terminal of the switch 45 with one terminal of a film supply indicator buzzer 129, and a branch wire 131 connects the other terminal of the buzzer 129 and one terminal of an indicator lamp 132 with one terminal of the low voltage secondary 101 of the transformer 97. The other terminal of the transformer 101 is connected by a wire 133 with the wire 107, and the other terminal of the indicator lamp 132 is connected by a branch wire 134 with the contact 81 of the switch 75 and with the contact 72 of the relay switch 65. The contact 73 of the relay switch 65 is connected by a branch wire 135 with the contact 82 of the switch 75 and with the wire 108.

The interval timer 115 serves in cooperation with the switch 123 and the relay 63—65—64 for conveniently and with a minimum attention on the part of the operator, driving the sensitized strip feeding means from the motor 9 independently of the sheet controlled switch 49 to wind the usual leader and trailer portions of the sensitized strip 14 in the camera 13 from the feed reel 17 onto the take up reel and then to automatically stop operation of the strip feeding means, providing that the control switch 75 remains in the position shown in Figure 3 in which the switch arm 76 is in contact with the contact 77 and thus connects the switch arm 68 and the cycle switch 123 with the line wire 53. This requires only that the operator momentarily close the cycle switch 123.

Observing that the timer switch 118 and the contact 67 and switch arm 68 are connected in series controlling relation with the timer motor coil 121 and relay coil 63 and that the cycle switch 123 is connected in controlling relation with the timer motor coil and relay coil, closure of the cycle switch energizes the timer motor coil and relay coil, with the result that the timer motor 115 actuates the switch arm 116 at a governed velocity toward the timer motor switch 118 and that the relay coil moves the switch arms 68 and 74 of the relay switches 64 and 65 respectively out of contact with the contacts 66 and 71 and respectively into contact with the contacts 67 and 72 and the switch arm 74 also moves the contact 72 into contact with the contact 73.

Contact of the switch arm 68 with the contact 67 energizes the timer motor coil and relay coil independently of the cycle switch 123, so that as soon as such contact is made the operator can release the cycle switch 123 to open and pay no further attention to the leader or trailer winding operation. Energization of the timer motor coil and relay coil being continued by contact of the switch arm 68 with the contact 67, the timer motor continues to actuate the switch arm 116 toward the timer switch 118 until this switch arm, driven at a governed velocity by the timer motor, opens the timer switch 118 and thus deenergizes the timer motor coil and relay coil, whereupon the timer interval terminates and the relay switches are restored to their normal positions as shown in Figure 3 and the switch arm 116 returns to its normal position against the stop 117 and permits the timer switch to close preparatory to another timing cycle initiated by momentary closure of the switch 123.

The switch arm 74 and the contact 73 having the contact 72 therebetween are connected in series controlling relation with the solenoid clutch element 33 in shunt relation with the sheet controlled clutch switch 49, and when this switch arm and these contacts are in contact, under the control of the timer, the clutch element 33 is energized to engage the clutch 33—34 and drive the sensitized strip feeding means of the camera and thus feed the sensitized strip 14. Contact of the switch arm 74 with the contact 72 energizes the indicator lamp 132 to indicate that the timer is operating, and the switch arm 74 and contact 71 and the film supply switch 45 being connected in series controlling relation with the film supply indicator buzzer 129 and being out of contact during operation of the timer, the supply switch 45 and buzzer are rendered inoperative during such operation. The switch arm 68 and contact 66 being connected in series controlling relation with the illuminating lamps 15 and being out of contact during operation of the timer, the illuminating lamps are not energized during operation of the timer.

The switch arm 76 and the contact 77 of the control switch 75, being connected in series controlling relation with the illuminating lamps 15 and with the timer motor and relay coils 121 and 63, this switch arm and contact must be in contact as shown in Figure 3, for the normal functioning of the micro-recorder for photographing sheets and for the operation of the timer, and this switch serves for driving the sensitized strip feeding means to feed the sensitized strip 14 in the camera for the purpose of spacing portions of the sensitized strip upon which sheets are photographed and thus separating the photographs of different groups of sheets on the sensitized strip.

This spacing is accomplished by placing the control switch 75 in the position thereof opposite that which it is shown in Figure 3. In this opposite position the switch arm 76 is out of contact with contact 77 and the switch arms 78 and 79 are in contact respectively with the contacts 81 and 82, and in this opposite or spacing position of the switch 75, the switch arm 76 and contact 77 being connected in series controlling relation with the illuminating lamps 15 and in series with the switch arm 64 and contact 66 and the switches 47 and 50, the illuminating lamps are not energized during the spacing operation, the switch arm 78 being in contact with the contact 81 and this switch arm and contact being connected in series controlling relation with the indicator lamp in shunt with the switch arm 74 and contact 72, this lamp is energized during the spacing operation, and the switch arm 79 being in contact with the contact 82 and this switch arm and contact being connected in series controlling relation with the solenoid slutch element 33 in shunt with the switch arm 74 and the contact 73 and the switch 49, this clutch element is energized and the clutch 33—34 is engaged to drive the strip feeding mechanism in the camera to feed the sensitized strip 14.

The switch 75 is maintained in its spacing position just described until the desired length of the sensitized strip has been fed, after which it is returned to the position shown in Figure 3 for the functioning of the micro-recorder for photographing sheets or for the feeding of the film strip under the control of the timer, and observing that the switch arm 76 and contact 77 are connected in series controlling relation with the relay coil 63, the relay coil is maintained in deenergized condition during the spacing operation.

While I have thus described my invention, I do not wish to be limited to the precise details described, as changes may be readily made without departing from the spirit of my invention, but having thus described my invention, I claim as new and desire to secure by Letters Patent the following:

1. In a photographic apparatus, the combination of a camera including sensitized strip feeding means, sheet feeding means, an electromagnetic clutch for driving said strip feeding means in synchronism with said sheet feeding means, a switch connected in controlling relation with said clutch and under the control of sheets fed by said sheet feeding means, an electromagnetic relay comprising a relay coil and a switch under the control of said relay coil and connected in controlling relation with said clutch in shunt relation with said sheet controlled switch, an interval timer, means under the control of said timer for maintaining said relay coil in clutch engaging condition during the timing interval of said timer and terminating said condition at the end of said timing interval, means for concomitantly placing said relay coil in said condition and initiating the timing cycle of said timer, and a switch connected in controlling relation with said clutch in shunt relation with said sheet controlled and relay switches.

2. In a photographic apparatus, the combination of a camera including sensitized strip feeding means, sheet feeding means, electrically energizable sheet illuminating means, an electromagnetic clutch for driving said strip feeding means in synchronism with said sheet feeding means, switch means connected in controlling relation with said clutch and illuminating means and under the control of sheets fed by said sheet feeding means, an electromagnetic relay comprising a relay coil and switch means under the control of said relay coil and connected in controlling relation with said clutch in shunt relation with said sheet controlled switch means and in controlling relation with said illuminating means in series relation with said sheet controlled switch means to simultaneously engage said clutch and deenergize said illuminating means, an interval timer, means under the control of said timer for maintaining said relay coil in clutch-engaging and illuminating means-deenergizing condition during the timing interval of said timer and terminating said condition at the end of said timing interval, means for concomitantly placing said relay coil in said condition and initiating the timing cycle of said timer, and switch means connected in controlling relation with said clutch in shunt relation with said sheet controlled and relay switch means and with said illuminating means in series relation with said sheet controlled and relay switch means to simultaneously engage said clutch and deenergize said illuminating means.

3. In a photographic apparatus, the combination of a camera including sensitized strip feeding means, a sheet feeding means, an electromagnetic clutch for driving said strip feeding means in synchronism with said sheet feeding means, a switch connected in controlling relation with said clutch and under the control of sheets fed by said sheet feeding means, electrically energizable indicating means, an electromagnetic relay comprising a relay coil and switch means under the control of said relay coil and connected in controlling relation with said clutch in shunt relation with said sheet controlled switch and with said indicating means to simultaneously engage said clutch and energize said indicating means, an interval timer, means under the control of said timer for maintaining said relay coil in clutch-engaging indicating-means-energizing condition during the timing interval of said timer and terminating said condition at the end of said timing interval, means for concomitantly placing said relay coil in said condition and initiating the timing cycle of said timer, and switch means connected in controlling relation with said clutch in shunt relation with said sheet controlled switch and relay switch means and with said indicating means in shunt relation with said relay switch means to simultaneously engage said clutch and energize said indicating means.

4. In a photographic apparatus, the combination of a camera including sensitized strip feeding means, sheet feeding means, electrically energizable sheet illuminating means, an electromagnetic clutch for driving said strip feeding means in synchronism with said sheet feeding means, switch means connected in controlling relation with said clutch and illuminating means and under the control of sheets fed by said sheet feeding means, electrically energizable indicating means, an electromagnetic relay comprising a relay coil and switch means under the control of said relay coil and connected in controlling relation with said clutch in shunt relation with said sheet controlled switch means and in controlling relation with said illuminating means in series relation with said sheet controlled switch means and in controlling relation with said indicating means to simultaneously engage said clutch and respectively deenergize and energize said illuminating and indicating means, an interval timer, means under the control of said timer for maintaining said relay coil in clutch-engaging illuminating-means-deenergizing and indicating-means-energizing condition during the timing interval of said timer and terminating said condition at the end of said timing interval, means for concomitantly placing said relay coil in said condition and initiating the timing cycle of said timer, and switch means connected in controlling relation with said clutch in shunt relation with said relay and sheet controlled switch means and with said illuminating means in series relation with said sheet controlled and relay switch means and with said indicating means in shunt relation with said relay switch means to simultaneously engage said clutch and respectively deenergize and energize said illuminating and indicating means.

5. In a photographic apparatus, the combination of a camera including sensitized strip feeding means, sheet feeding means, electrically energizable sheet illuminating means, an electromagnetic clutch for driving said strip feeding means in synchronism with said sheet feeding means, switch means connected in controlling relation with said clutch and illuminating means and under the control of sheets fed by said sheet feeding means, a first electrically energizable indicating means, a second electrically energizable indicating means, a switch connected in controlling relation with said first indicating means and under the control of a sensitized strip in said camera to indicate the approaching completion of the exposure of said strip, an electromagnetic relay comprising a relay coil and switch means under the control of said relay coil and connected in controlling relation with said clutch in shunt relation with said sheet controlled switch means and in controlling relation with said illuminating means in series relation with said sheet controlled switch means and with said first indicating means in series relation with said sensitized strip controlled switch and with said second indicating means to simultaneously engage said clutch and deenergize said illuminating means and respectively energize and deenergize said second and first indicating means, an interval timer, means under the control of said timer for maintaining said relay coil in clutch-engaging illuminating-means-deenergizing first indicating means deenergizing and second-indicating-means-energizing condition during the timing interval of said timer and terminating said condition at the end of said timing interval, means for concomitantly placing said relay coil in said condition and initiating the timing cycle of said timer, and switch means connected in controlling relation with said clutch in shunt relation with said relay and sheet controlled switch means and with said illuminating means in series relation with said relay and sheet controlled switch means and with said second indicating means in shunt relation with said relay switch means to simultaneously engage said clutch and respectively deenergize and energize said illuminating and second indicating means.

6. In a photographic apparatus, the combination of claim 1 and further comprising said last mentioned switch being also connected in controlling relation with said relay coil to simultaneously engage said clutch and maintain said relay coil out of said condition.

7. In a photographic apparatus, the combination of claim 4 and further comprising said last mentioned switch means being also connected in controlling relation with said relay coil to simultaneously engage said clutch and respectively deenergize and energize said illuminating and indicating means and maintain said relay coil out of said condition.

8. In a photographic apparatus, the combination of a camera including sensitized strip feeding means, sheet feeding means, an electromagnetic clutch for driving said strip feeding means in synchronism with said sheet feeding means, a switch connected in controlling relation with said clutch and under the control of sheets fed by said sheet feeding means to energize and engage said clutch while under said control, and low potential circuit means connected with said clutch in shunt relation with said switch for maintaining said clutch in partially energized disengaged condition.

9. In a photographic apparatus, the combination of a camera including sensitized strip feeding means, sheet feeding means, an electromagnetic clutch for driving said strip feeding means in synchronism with said sheet feeding means, and a supply circuit for said clutch comprising a switch connected in controlling relation with said clutch and under the control of sheets fed by said sheet feeding means to energize and engage said clutch while under said control and a resistance connected with said clutch in shunt relation with said switch for maintaining said clutch in partially energized disengaged condition.

FRANK L. WENINGER.

References Cited in the file of this patent

UNITED STATES PATENTS

| Number | Name | Date |
|---|---|---|
| 2,391,274 | Schubert | Dec. 18, 1945 |
| 2,403,711 | Egan | July 9, 1946 |
| 2,419,836 | Holbrook | Apr. 29, 1947 |
| 2,481,694 | Schubert | Sept. 13, 1949 |